United States Patent Office 3,704,322
Patented Nov. 28, 1972

3,704,322
N-ALKYL-N'-(1-NAPHTHOYL) ETHYLENE DIAMINES
Mario Giannini, Florence, Italy, assignor to Malesci S.A.S. Istituto Farmacobiologico, Florence, Italy
No Drawing. Filed Feb. 18, 1970, Ser. No. 12,475
Claims priority, application Italy, Sept. 24, 1969, 40,263/69
Int. Cl. C07c 103/30
U.S. Cl. 260—558 R
1 Claim

ABSTRACT OF THE DISCLOSURE

Process for preparing ethylene diamine derivatives of the general formula:

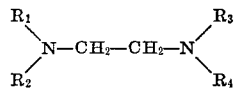

where:

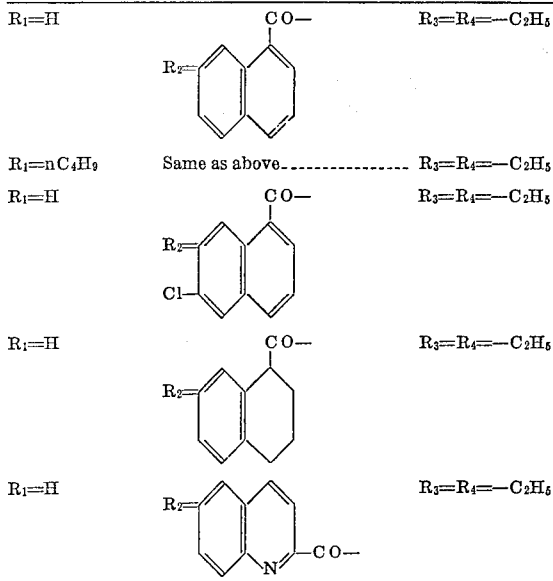

wherein the chlorides of the corresponding acids are reacted with the appropriate amine in anhydrous benzene, or where:

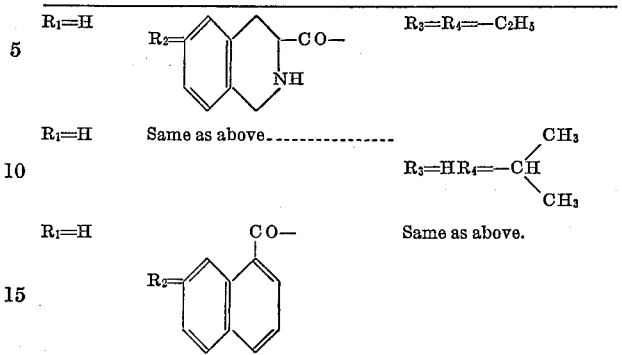

wherein the α-naphthoic acid ethyl ester and 1:2:3:4-tetra-isoquinolyl-3-carboxylic acid ethyl ester are reacted with the appropriate amine in the absence of solvent.

---

The present invention relates to a process for preparing ethylene diamine or imidazoline derivatives.

The purpose of the present invention is the synthesis of ethylene diamine or imidazoline derivatives which can be utilized as antifibrillators.

It is known that fibrillation is a very dangerous disturbance of the cardiac rhythm; such a disturbance of the cardiac rhythm is revealed by alterations both increasing and decreasing of the frequency regularity of the cardiac pulsations.

It has now been found, and this forms the object of the present invention, that some ethylene diamine or imidazoline derivatives can be advantageously utilized in the therapeutic treatment of said disturbances.

The ethylene diamine derivatives can be represented by the following general formula:

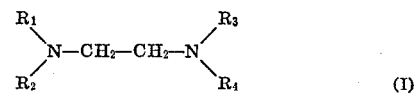

where:

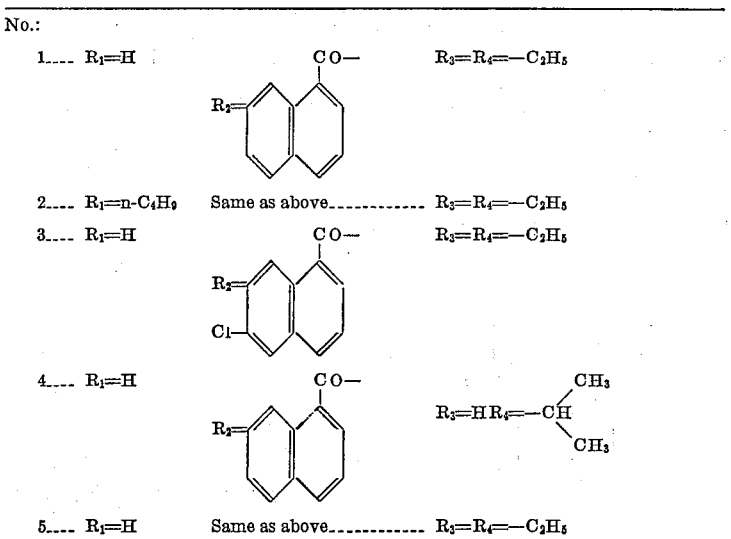

TABLE—Continued

| No.: | | |
|---|---|---|
| 6 | $R_1$=H 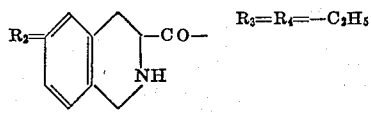 | $R_3$=$R_4$=—$C_2H_5$ |
| 7 | $R_1$=H  Same as above | $R_3$=H $R_4$=—CH(CH$_3$)$_2$ 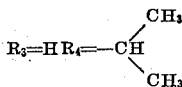 |
| 8 | $R_1$=H 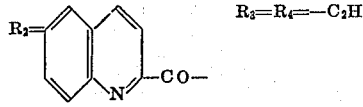 | $R_3$=$R_4$=—$C_2H_5$ |
| 9 | $R_1$=H  Same as above | $R_3$=—$CH_2$—CH=$CH_2$ $R_4$=—$C_2H_5$ | while the imidazoline derivatives can be represented by the following general formula:

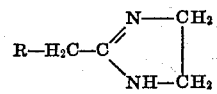    (II)

where:

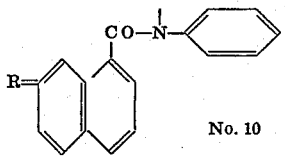

No. 10

The compounds reported under numbers 1, 2, 3, 5 and 8 of the general Formula I are obtained by reacting the chlorides of the corresponding acids with the appropriate amine in anhydrous benzene.

The compounds reported under numbers 6, 7 and 4 of the same general Formula I, on the other hand, are obtained by reacting, in the absence of solvent, α-naphthoic and 1:2:3:4-tetrahydro-isoquinolyl - 3 - carboxylic acid ethyl esters with the appropriate amine.

The isolation of the reaction products is then obtained by extracting the benzene solution, or the reaction mixture, with 10 percent hydrochloric acid and saturating the acidic aqueous solution with potassium carbonate.

An oily layer will separate, which is extracted with ether, the ether is removed and the oily residue is distilled under vacuum.

The products 9 and 10 of the general Formulas I and II, respectively, are an exception to these general methods of preparation.

The product 9 is obtained by condensing the quinolyl-2-carboxylic acid chloride with ethylene imine in anhydrous benzene, to obtain the quinolyl-2-carboxylic acid ethylene imide (c), which is reacted with ethyl allyl amine in acetone to obtain product 9, which is purified by vacuum distillation.

Said process can be represented schematically as follows:

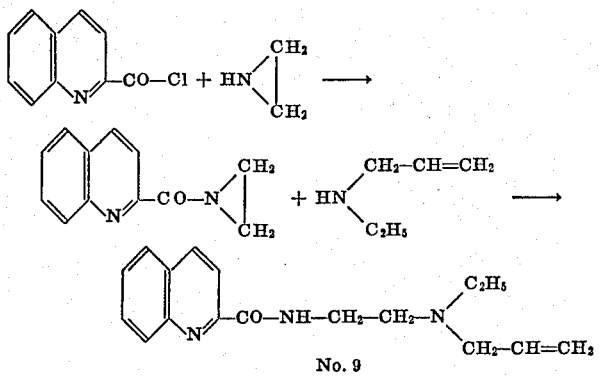

No. 9

The hydrochloride of said product 9 can be isolated from the base in ether solution by addition of gaseous hydrochloric acid.

The product 10 is prepared by reacting the α-naphthyl anilide (a) with chloromethyl-2-imidazoline (b) in dimethyl formamide and in the presence of sodium amide, according to following reaction scheme:

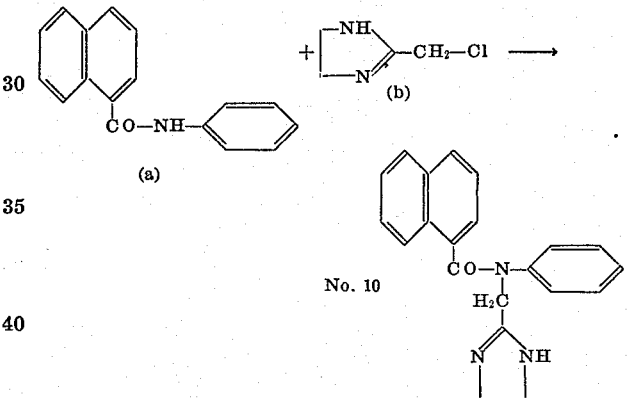

The product 10 is isolated by drying the reaction mixture, diluting it with ethyl acetate and precipitating the hydrochloride by means of saturation with gaseous HCl. From the aqueous hydrochloride solution, after alkalinization with ammonia and extraction with ethyl acetate, is obtained the base, which can be further purified by crystallization from ethyl acetate.

The following examples illustrate the procedures by which products from 1 to 10 described in the present invention are obtained.

The individual products are grouped in the various preparation examples on the basis of the analogy of their preparation as it has been set forth above.

EXAMPLE 1

N-(2-diethylaminoethyl)-α-naphthylamide (Prod. No. 1)

Into a solution containing 19 g. (0.1 mol) of α-naphthoic acid chloride in 100 ml. of benzene with agitation and cooling for half an hour a benzene solution (50 ml.) of 23.2 g. (0.2 mol) of diethylamine-ethyl amine is dropped. As the dropping is ended, the solution is kept under agitation in a water bath for 3 hours.

After cooling the benzene solution is extracted with 200 ml. of 10 percent hydrochloric acid; then the aqueous solution is saturated with potassium carbonate. The separated oil is extracted with ether and, after drying on sodium sulfate, the solvent is removed and the residue is vacuum distilled. Yield 85 percent. B.P. 182° C. at 0.2 mm./Hg.

Analysis.—Calc. for $C_{17}H_{22}N_2O$ (percent): C, 75.53; H, 8.20; N, 10.36. (M.W.=270.36). Found (percent): C, 75.33; H, 8.27; N, 10.36.

In analogous manner the following compounds are prepared:

N-(2-diethylamino-ethyl)-N-(n-butyl)-α-naphthylamide (Prod. No. 2) B.P. 178° C. at 0.1 mm./Hg

*Analysis.*—Calc. for $C_{21}H_{30}N_2O$ (percent): C, 77.25; H, 9.26; N, 8.58 (M.W.=326.46). Found (percent): C, 77.22; H, 9.65; N, 8.62. Yield 90 percent.

N-(2-diethylamino-ethyl)-6-chloro-α-naphthylamide (Prod. No. 3) B.P. 210° C. at 0.4 mm./Hg

*Analysis.*—Calc. for $C_{17}H_{21}ClN_2O$ (percent): C, 66.98; H, 6.94; N, 9.18 (M.W.=304.86). Found (percent): C, 67.16; H, 7.30; N, 9.35. Yield 90 percent.

N-(2-diethylamino-ethyl)-quinolyl-2-carboxyamide (Prod. No. 8) B.P. 185° C. at 0.3 mm./Hg

*Analysis.*—Calc. for $C_{16}H_{21}N_3O$ (percent): C, 70.81; H, 7.80; N, 15.49. (M.W.=271.35). Found (percent): C, 70.33; H, 8.13; N, 15.73. Yield 80 percent.

N-(2-diethylamino-ethyl)-1:2:3:4-tetrahydro-α-naphthylamide (Prod. No. 5) B.P. 171° C. at 0.02 mm./Hg

*Analysis.*—Calc. for $C_{17}H_{26}N_2O$ (percent): C, 74.45; H, 9.54; N, 10.20 (M.W.=274.38). Found (percent): C, 74.48; H, 9.28; N, 10.40. Yield 80 percent.

EXAMPLE 2

N-(2-diethylamino-ethyl)-1:2:3:4-tetrahydroisoquinolyl-3-carboxyamide (Prod. No. 6)

20.6 g. (0.1 mol) of the 1:2:3:4-tetrahydroisoquinolyl-3-carboxylic acid ethyl ester and 23.2 g. (0.2 mol) of diethylaminoethyl amine are kept in an oil bath at 130° C. for 6 hours. After cooling the reaction mixture is poured into water saturated with potassium carbonate and is extracted with chloroform. B.P. 205 to 210° C. at 0.1 mm./Hg.

*Analysis.*—Calc. for $C_{16}H_{25}N_3O$ (percent): C, 69.75; H, 9.15; N, 15.27 (M.W.=275.39). Found (percent): C, 69.75; H, 9.20; N, 15.28. Yield 30 percent.

N-(2-isopropylamino-ethyl)-1:2:3:4-tetrahydroisoquinolyl-3-carboxyamide (Prod. No. 7) B.P. 198 to 200° C. at 0.5 mm./Hg

*Analysis.*—Calc. for $C_{15}H_{23}N_3O$ (percent): C, 68.95; H, 8.87; N, 16.08 (M.W.=261.36). Found (percent): C, 69.11; H, 9.16; N, 16.05. Yield 35 percent.

N-(2-isopropylamino-ethyl)-α-naphthylamide hydrochloride (Prod. No. 4) B.P. 195 to 200° C. at 0.1 mm./Hg M.P. of the hydrochloride: 206 to 208° C. (from alcohol).

*Analysis.* — Calc. for $C_{16}H_{20}N_2OHCl$ (percent): C, 65.63; H, 7.23; N, 9.56 (M.W.=292.79). Found (percent): C, 65.61; H, 7.55; N, 9.75. Yield 30 percent.

EXAMPLE 3

Quinolyl-2-carboxylic acid ethylene imide (Compound C)

19.1 g. (0.1 mol) of quinolyl-2-carboxylic acid chloride in 500 ml. of anhydrous benzene are added, with agitation and cooling, to a solution of 8.6 g. (0.2 mol) of ethylene imine in 120 ml. of benzene.

As the addition is ended, the solution is kept at room temperature for one hour and a half and then for half an hour at 60° C. The solution is filtered, treated with carbon and concentrated to a small volume; thus the product C crystallizes from ligroine with a M.P. at 98 to 99° C.

*Analysis.*—Calc. $C_{12}H_{10}N_2O$ (percent): C, 72.72; H, 5.09; N, 14.14 (M.W.=198.21). Found (percent): C, 72.77; H, 5.42; N, 14.25. Yield 80 percent.

N-(ethyl-allyl-β-ethyl-amino)-quinolyl-2-carboxyamide (Prod. No. 9)

To a solution of 19.8 g. (0.1 mol) of quinolyl-2-carboxylic acid ethylene imide in 200 ml. of acetone 9.35 g. (0.11 mol) of ethyl allyl amine are added.

The solution is refluxed for 9 hours. The solvent is removed under vacuum and the residual pitchy mass is taken up with ether. The solution is dried and the residual oil is solubilized in water by acidifying it with hydrochloric acid to a pH 5. The aqueous solution is decolorized with carbon filtered, and alkalinized with potassium carbonate. The oil which separates is extracted with ether. The ethereal solution is vacuum distilled. B.P. 182° C. at 0.05 mm./Hg.

By adding gaseous hydrochloric acid to an ethereal solution of the base, the hydrochloride is separated: M.P. 178° C. (from isopropyl alcohol).

*Analysis.* — Calc. for $C_{17}H_{21}N_3OHCl$ (percent): C, 63.84; H, 6.93; N, 13.14 (M.W.=319.81). Found (percent): C, 63.42; H, 7.32; N, 13.18. Yield 65 percent.

EXAMPLE 4

N-phenyl-N(2-imidazolinylmethyl)-γ-naphthylamide (Prod. No. 10)

24.70 g. (0.1 mol) of naphthyl anilide are dissolved in 140 ml. of dimethyl formamide; to this solution are added, with agitation, 3.9 g. (0.1 mol) of sodium amide. The agitation is continued for 2 hours at room temperature. Then 11.80 g. (0.1 mol) of 2-chloromethyl imidazoline dissolved in 140 ml. of anhydrous benzene are added and the solution is kept under stirring for 3 hours at room temperature. The reaction mixture is held in a refrigerator for 12 hours and the solvent is eliminated under vacuum. The residual oil is dissolved in ethyl acetate and the hydrochloride of the product No. 10 is precipitated by gaseous hydrochloric acid. It is filtered washing with ethyl acetate and then with isopropyl alcohol. M.P. 329° C. (from anhydrous ethyl alcohol). Yield 30 percent. From the hydrochloride the free base can be obtained (Product No. 10) by alkalizing the aqueous hydrochloride solution with ammonia and extracting it with ethyl acetate. M.P. 146° C. from ethyl acetate.

*Analysis.*—Calc. for $C_{21}H_{19}N_3O$ (percent): C, 76.57; H, 5.81; N, 12.76 (M.W.=329.37). Found (percent): C, 76.30; H, 6.19; N, 12.62.

The products obtained with the procedures of the present invention, that are utilizable as antifibrillators, can be supplied by mouth and parenterally in a daily total dose of 0.6 to 1.2 g. by mouth and 0.05 to 0.4 g. parenterally.

Having thus described the present invention, what is claimed is:

1. The compound having the formula:

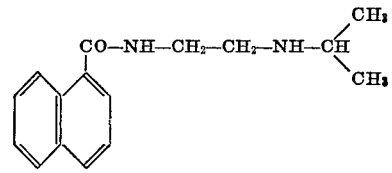

References Cited

FOREIGN PATENTS 822,483  10/1959  England _____ 260—558

HARRY I. MOATZ, Primary Examiner

U.S. Cl. X.R.

260—287 R, 309.6, 558 D; 424—258, 324

UNITED STATES PATENT OFFICE
CERTIFICATE OF CORRECTION

Patent No. 3,704,322                    Dated November 28, 1972

Inventor(s)    Mario Giannini

It is certified that error appears in the above-identified patent and that said Letters Patent are hereby corrected as shown below:

The following claim should be added:

2. The compound having the formula:

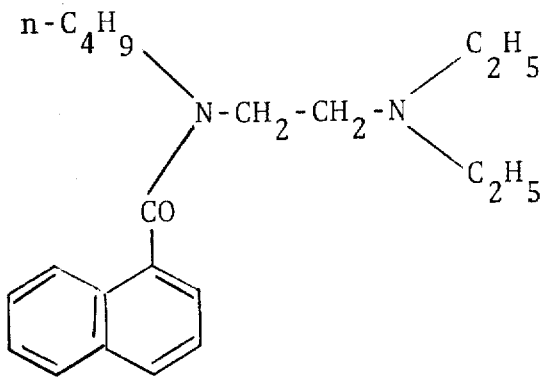

Signed and sealed this 31st day of December 1974.

(SEAL)
Attest:

McCOY M. GIBSON JR.          C. MARSHALL DANN
Attesting Officer            Commissioner of Patents